(12) United States Patent
Wilinski et al.

(10) Patent No.: US 8,655,732 B1
(45) Date of Patent: Feb. 18, 2014

(54) LIQUID DISPENSATION

(76) Inventors: Mark Edward Wilinski, Arlington, VA (US); Sharon Mary Wilinski, Arlington, VA (US)

(*) Notice: Subject to any disclaimer, the term of this patent is extended or adjusted under 35 U.S.C. 154(b) by 1136 days.

(21) Appl. No.: 12/607,189

(22) Filed: Oct. 28, 2009

(51) Int. Cl.
*G06Q 30/00* (2012.01)
*G06Q 50/00* (2012.01)

(52) U.S. Cl.
USPC .......................................................... 705/15

(58) Field of Classification Search
USPC .......................................................... 705/15
See application file for complete search history.

(56) References Cited

U.S. PATENT DOCUMENTS

| | | | | |
|---|---|---|---|---|
| 4,979,641 | A * | 12/1990 | Turner | 222/25 |
| 6,131,767 | A * | 10/2000 | Savage et al. | 222/1 |
| 6,367,660 | B1 * | 4/2002 | Chang | 222/153.09 |
| 7,388,493 | B2 * | 6/2008 | Lerch et al. | 340/572.1 |
| 2006/0087438 | A1 * | 4/2006 | Lerch et al. | 340/572.9 |
| 2007/0239549 | A1 * | 10/2007 | LaFauci et al. | 705/15 |
| 2008/0189078 | A1 * | 8/2008 | Vok et al. | 702/188 |
| 2009/0266443 | A1 * | 10/2009 | Browne-Wilkinson | 141/198 |

* cited by examiner

*Primary Examiner* — Seye Iwarere (57) ABSTRACT

A liquid dispensation framework is described for dispensing liquid. A serving station may include one or more liquid containing devices, one or more taps, a data processor, a payment module, a monitoring module, and a cabinet with a lock. The serving station may be configured to determine an identity of a user and whether the user is authorized to withdraw liquid. If the serving station determines that the user is authorized to withdraw liquid, the amount or volume of liquid dispensed may be controlled, and an account associated with the user (or another) may be charged based on the amount or volume of liquid dispensed.

26 Claims, 6 Drawing Sheets

LIQUID DISPENSATION

FIELD

Aspects of the present disclosure relate to a dispensation of liquid. More specifically, aspects of the disclosure relate to controlling the volume and rate at which liquids may be dispensed.

BACKGROUND

Saturday nights at a local bar or tavern can be quite busy. Slow drink service hurts the bar/tavern's business. For example, a patron may elect to forego that last drink of soda, juice, milk, coffee, tea, wine, beer, spirits, etc., rather than be forced to wait for a server, waiter/waitress, bartender, or the like to take the patron's next order.

Conventional service techniques require a patron to purchase a "whole" drink. For example, a patron is not provided an opportunity to order a half a drink, a quarter drink, or the like because such service would be impractical. A patron may desire less than a "whole" drink, from a volume consumption perspective. Additionally, a slow drinker might want to purchase a "whole" drink as fractional shares/portions across multiple orders in order to ensure that the drinks are consumed within a threshold temperature. For example, a slow drinker might want to order two half-drinks of soda (rather than a whole glass of soda at a single time) in order to consume the two half-drinks at an ideal (e.g., cold) temperature. Moreover, no two "whole" drinks are poured equally, and thus, a patron that receives less than her fair share may feel cheated.

Furthermore, a patron frequently opens "a tab" with a bartender. Opening a tab often entails the patron giving the bartender a credit card (or some other form of collateral) to serve as security for drink purchases. At the conclusion of the patron's stay, the patron typically closes out the tab with the bartender. Sometimes, particularly when the bar is busy, the bartender may erroneously charge the patron with another customer's drinks. Even if the patron is given a bill of sale prior to finalizing payment, the patron might not notice the overcharge error until much later (e.g., when the patron gets home). If the error is caught prior to finalizing payment, one or more of the patron, the bartender, and the owner of the tavern may feel "cheated," even if the oversight was a mere accident/mistake. For example, the patron may believe that the bartender or tavern tried to "pull a fast one" to earn more money, and may hold it against the bartender or tavern in the future. The owner of the tavern might suspect that the patron is lying in order to reduce the bill. Similarly, the bartender might suspect that the patron is lying in order to reduce the bill (and ultimately, TIP money that the bartender earns, which is typically a fraction or percentage of the total bill).

In terms of drink service, a tavern or restaurant employs bartenders, wait staff, bus boys, and the like. These employees cost the tavern/restaurant in terms of payment of employee salaries and benefits.

Moreover, with respect to alcoholic beverages, one or more of the employees are asked to check patrons of youthful appearance for a form of identification (e.g., a driver's license, a passport, etc.) to ensure that the patrons are of legal age to consume the alcoholic beverages. Such a process potentially exposes the tavern/restaurant and the employees to liability for failure to adequately enforce the policies associated with the age requirements. For example, a server may simply forget to check a patron's identification (particularly on a busy night), a server may think that another employee (e.g., a bartender) already checked for identification, or a patron might present a fake/phony photo identification or a photo identification of another that looks like the patron. Conversely, if a patron is asked for his/her photo identification on more than one occasion during a visit, the patron may become annoyed.

Even if the tavern/restaurant checks for identification at the door, the tavern/restaurant has to employ staff (e.g., a bouncer) to perform that check. Furthermore, checking identifications at the door may establish a bottleneck in terms of patron flow. Moreover, in some jurisdictions, a tavern/restaurant or employee thereof may be liable for over-serving a patron with intoxicating beverages in the event that the patron is later involved in an accident (e.g., a car accident due to drunk driving).

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a liquid dispensation framework for dispensing liquid. The framework may include a serving station that, in turn, may include one or more liquid containing devices, one or more taps, a data processor, a payment module, a monitoring module, and a cabinet. The cabinet may be outfitted with a lock. The serving station may be configured to determine an identity of a patron and whether the patron is authorized to withdraw liquid. If the serving station determines that the patron is authorized to withdraw liquid, the amount/volume of liquid dispensed may be controlled, and the patron may be charged based on the amount/volume dispensed.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, apparatuses, systems and methods are described for dispensing liquid. While largely stated in terms of beverages, the techniques and methodologies described herein may be adapted to accommodate other forms of liquid dispensation.

In some embodiments, liquid dispensation may be obtained in a manner ensuring analytical rigor and achieving consistent thresholds across business units (e.g., taverns/bars, restaurants, and the like). Aspects of liquid dispensation may include determining an identity of a patron, verifying that the patron is authorized to purchase a liquid, opening a tab, dispensing a selected amount of liquid, and charging the opened tab based on the selected amount of liquid dispensed. Further aspects of the disclosure may entail the patron serving herself, the patron's blood alcohol content (BAC) and/or weight being determined, and the patron being denied an opportunity to dispense liquid once a volume of dispensed liquid exceeds a threshold (optionally per unit time).

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

Figure 1:
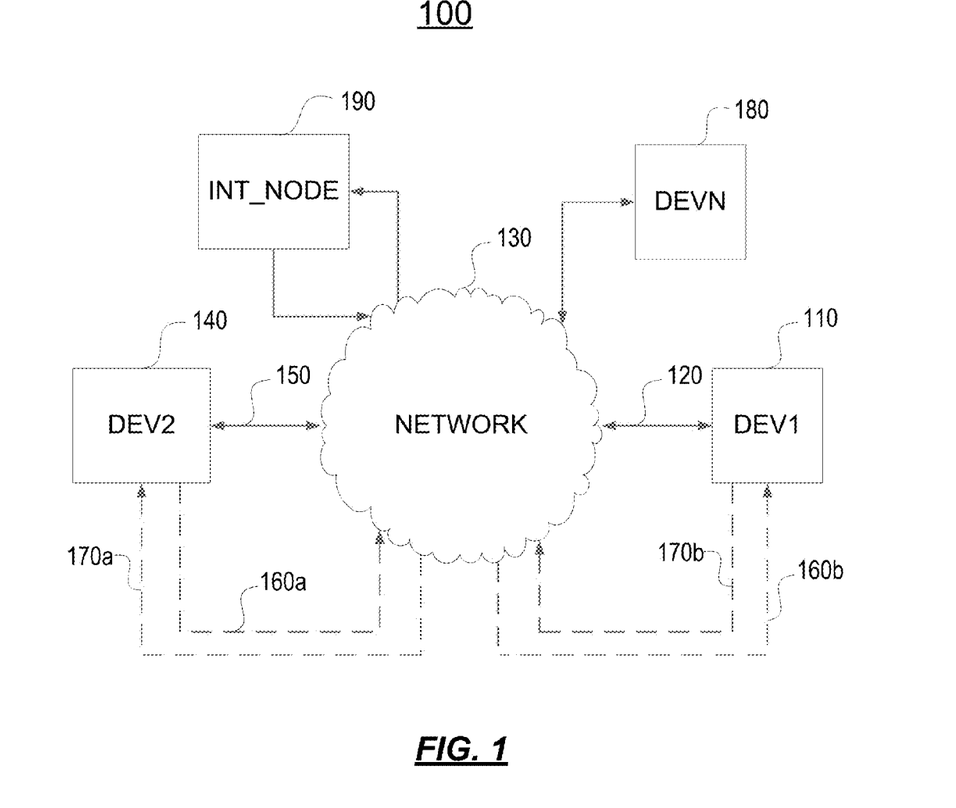
FIG. 1 illustrates a network computing environment in which various aspects of the disclosure may be implemented.

FIG. 1 illustrates a network computing environment 100 suitable for carrying out one or more aspects of the present disclosure. For example, FIG. 1 illustrates a first device DEV1 110 (e.g., a laptop, a PDA, a mobile station, a desktop computer, etc.) connected to a network 130 via a connection 120. Network 130 may include the Internet, an intranet, wired or wireless networks, or any other mechanism suitable for facilitating communication between computing platforms in general. FIG. 1 also depicts a second device DEV2 140 (e.g., a server) connected to network 130 via a connection 150. By virtue of the connectivity as shown, DEV1 110 and DEV2 140 may communicate with one another. Such communications may enable the exchange of various types of information. For example, the communications may include data to be exchanged between DEV1 110 and DEV2 140. Such data may include images, files, and the like. The communications may further include additional information such as control information.

Connections 120 and 150 illustrate interconnections for communication purposes. The actual connections represented by connections 120 and 150 may be embodied in various forms. For example, connections 120 and 150 may be hardwired/wireline connections. Alternatively, connections 120 and 150 may be wireless connections. Connections 120 and 150 are shown in FIG. 1 as supporting bi-directional communications (via the dual arrow heads on each of connections 120 and 150). Alternatively, or additionally, computing environment 100 may be structured to support separate forward (160a and 160b) and reverse (170a and 170b) channel connections to facilitate the communication.

Computing environment 100 may be carried out as part of a larger network consisting of more than two devices. For example, DEV2 140 may exchange communications with a plurality of other devices (e.g., DEVN 180) in addition to DEV1 110. The communications may be conducted using one or more communication protocols. Furthermore, computing environment 100 may include one or more intermediary nodes (e.g., INT_NODE 190) that may buffer, store, or route communications between the various devices.

Figure 2:
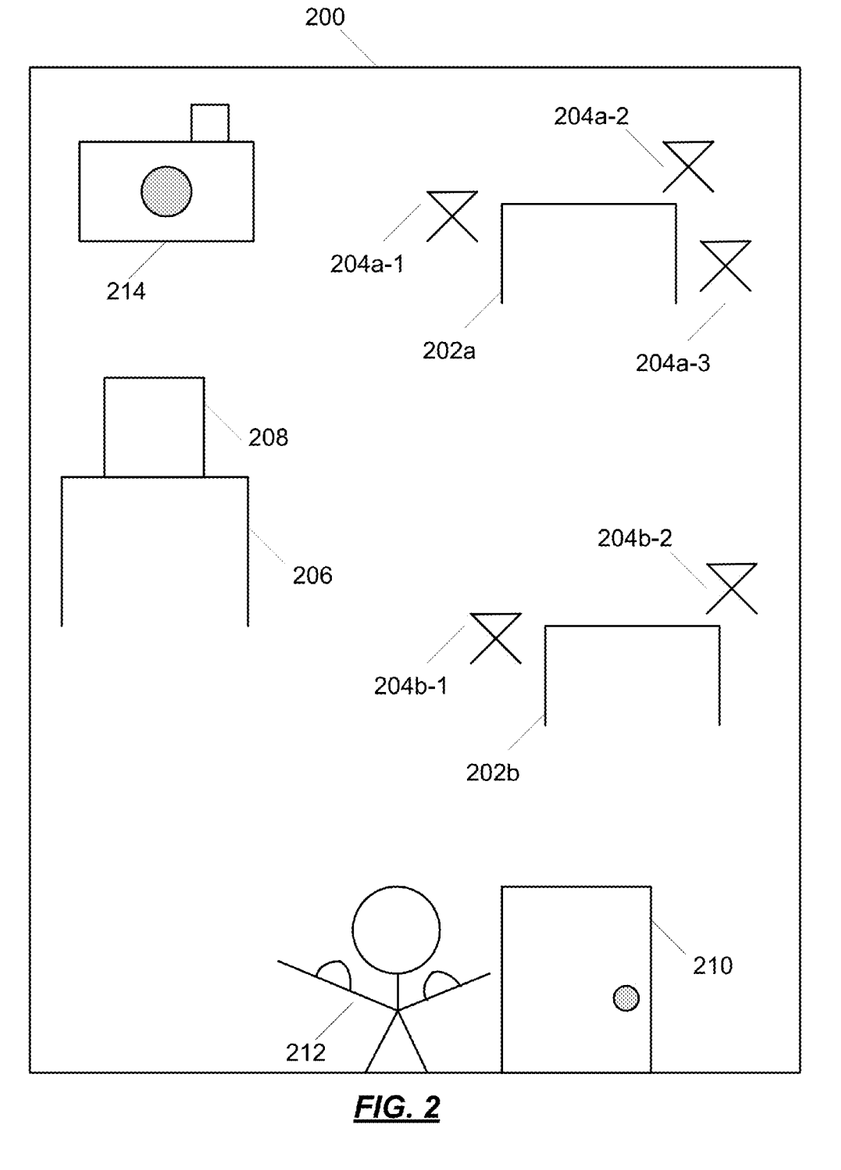
FIG. 2 illustrates an environment in which one or more aspects of the disclosure may be practiced.

FIG. 2 illustrates an environment in which one or more aspects of the disclosure may be practiced. More specifically, FIG. 2 illustrates an establishment 200. Establishment 200 may be a tavern, a bar, a restaurant, a nightclub, or the like.

An establishment may include one or more tables or serving stations for patron use. For example, as shown in FIG. 2, establishment 200 includes serving stations 202a and 202b.

Associated with serving stations may be one or more seats, stools, booths or the like, generally referred to as chairs herein. For example, as shown in FIG. 2, chairs 204a-1 through 204a-3 are associated with serving station 202a, and chairs 204b-1 through 204b-2 are associated with serving station 202b. Any number of chairs may be associated with each serving station.

Establishment 200 may include a bar 206. As described below, bar 206 may be a full-service bar and may include a complete assortment of beverages available at establishment 200. Alternatively, in some embodiments, bar 206 may include drinks that are not available at one or more of serving stations 202. Located at bar 206 may be a computer 208. Computer 208 may be used for purposes of entering and processing beverage orders. Computer 208 may also be used to control the degree to which a serving station 202 is enabled as described further below.

Establishment 200 may include a door or entrance 210, and outside of door/entrance 210 an employee or consultant 212 affiliated with establishment 200 may be positioned. For example, employee/consultant 212 may be a security officer or a bouncer (with bicep muscles as shown). Some embodiments might not include employee/consultant 212 in order to avoid impeding the free flow of patrons going into and coming out of establishment 200.

Establishment 200 may include one or more cameras 214. Cameras 214 may take the form of a still-frame camera, a movie/video camera, or the like. Cameras 214 may be used to monitor the floor of establishment 200 as described further below.

Establishment 200 of FIG. 2 is illustrative. Different formats or layouts for an establishment may be used in some embodiments. Furthermore, any number of serving station(s) 202 (and associated chairs 204) and bar(s) 206 may be included in an establishment.

Figure 3A:
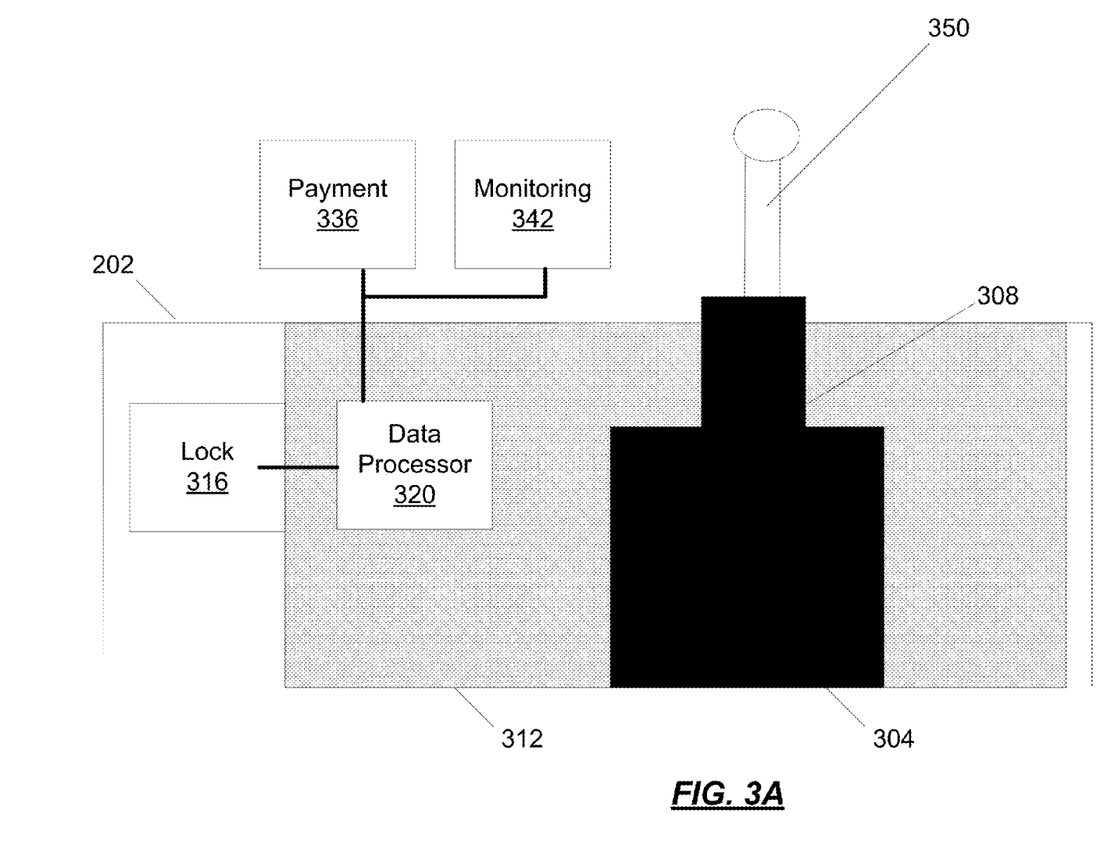
FIG. 3A illustrates a serving station in accordance with one or more aspects of the disclosure.

FIG. 3A illustrates a block diagram of one of serving stations 202 in greater detail. In particular, as shown in FIG. 3A is a liquid containing device 304. Liquid containing device 304 may be a keg (of beer) for example. Alternatively, liquid containing device 304 may hold carbonated water that may be mixed with solutions of syrup for various carbonated beverages (e.g., soda). Liquid containing device 304 may hold liquid representative of any beverage (e.g., juice, milk, coffee, tea, etc.). Moreover, while a single liquid containing device 304 is shown in FIG. 3A for purposes of illustrative simplicity, in some embodiments more than one liquid containing device 304 may be located within serving station 202.

Included in serving station 202 illustrated in FIG. 3A is liquid dispensing neck 308. While shown in FIG. 3A as simply connecting to (a single) liquid containing device 304, per the above description liquid dispensing neck 308 may connect to more than one liquid containing device and may be used to bring liquid towards the exposed surface (e.g., the table-top) of serving station 202.

Liquid containing device 304 and liquid dispensing neck 308 may be stored within a cabinet 312 (denoted by the diagonal lines). Cabinet 312 may be underneath and integrated into serving station 202. Cabinet 312 may include a door that can be locked/unlocked by management or personnel associated with establishment 200 for purposes of servicing serving station 202 (e.g., re-filling liquid containing device 304, replacing liquid containing device 304, etc). In this manner, patrons might not see liquid containing device 304 and liquid dispensing neck 308. Furthermore, by using a lock on cabinet 312, patrons may be precluded from obtaining unauthorized access to liquid (e.g., patrons might be precluded from obtaining free beverages).

Lock 316 associated with cabinet 312 may include a traditional padlock and key, a (metal) combination lock, or the like. Alternatively, or additionally, in some embodiments the lock may include an alphanumeric punchpad, wherein an entered sequence of button depressions entered on the punchpad may be compared against a security code stored in a data processor 320 to determine whether the entered sequence matches the security code. As shown in FIG. 3A, data processor 320 may be included in cabinet 312 in order to preclude patron tampering. Furthermore, while the punchpad may be positioned on the exterior of cabinet 312, in some embodiments the punchpad may be positioned at different locations. For example, the punchpad may be located at bar 206 of FIG. 2 or even offsite from establishment 200 (e.g., at a central office).

Data processor 320 may be one of DEV1 110, DEV2 140, and DEVN 180 of FIG. 1, and may include a processor (e.g., a microprocessor) and memory storing instructions that, when executed by the processor, cause data processor 320 to perform the comparison between the entered button depressions and the security code discussed above. The instructions, when executed, may also cause data processor 320 to perform additional methodological acts in combination with additional modules/components associated with serving station 202 as described herein.

A payment module 336 may be coupled to data processor 320 as shown in FIG. 3A. Payment module 336 may include a credit card or debit card module, wherein a patron runs (e.g., swipes) her credit card or debit card through payment module 336 to open a tab with establishment 200. After the tab is opened, the patron may be able to purchase/consume one or more beverages as described further below. The patron may close the tab when the patron has decided she has had enough drinks (and/or until she is "cut off" as described below), and the patron's credit/debit account may be charged once at that time. In some embodiments, instead of opening a tab with establishment 200, the patron's credit/debit account may be charged every time a beverage is purchased/consumed. The charging of the patron's credit/debit account may take place via data processor 320. For example, data processor 320 may be communicatively coupled to a server associated with a bank, credit/financing agency, or the like that maintains the patron's credit/debit account.

The credit/debit card module that is included in some embodiments of payment module 336 may serve to verify that a patron is of legal age to purchase alcoholic beverages. For example, after a patron runs/swipes her credit/debit card through payment module 336, data processor 320 may communicate with a server affiliated with the patron's credit/debit account. The server affiliated with the patron's credit/debit account may return to data processor 320 a status message indicative of whether the patron is of legal age in the jurisdiction to purchase alcoholic beverages. One or more status messages or audio alarms/alerts may be presented/played on a display device/audio speaker associated with payment module 336 to advise the patron whether she has been granted access to purchase beverages on the basis of her age.

In some embodiments, instead of a patron using her credit/debit card to purchase a beverage, the patron may be presented a card associated with establishment 200 when she enters establishment 200. The patron may open a tab with the card associated with establishment 200 by running/swiping the card through payment module 336 in a manner similar to running/swiping a credit/debit card as described above. The patron may then present the card associated with establishment 200 to a clerk when leaving establishment 200 for purposes of "checking out" or "closing out" her tab. At that time, the patron may have the option of (actually) paying her tab via cash, check, credit/debit card, money order and the like.

Serving station 202 may include a monitoring module 342 coupled to data processor 320 as shown in FIG. 3A. Monitoring module 342 may be used to "cut off" a patron from purchasing beverages. For example, a patron may have had one too many alcoholic beverages, and may be lacking at the moment the judgment to know that she has had enough.

Monitoring module 342 may take various forms in some embodiments. For example, monitoring module 342 may take the form of a breathalyzer. A patron may have to blow into the breathalyzer each time she attempts to engage a tap 350 to extract beverage from liquid containing device 304. Data correlative of the patron's breath may be analyzed by data processor 320 to determine if the patron's blood alcohol content (BAC) is below a predetermined BAC level. In some embodiments, the predetermined BAC level may correspond to a limit imposed by a jurisdiction for purposes of operating a motor vehicle. The predetermined BAC may be stored in a memory contained in data processor 320 or may be stored at a computer (e.g., a server) communicatively coupled to data processor 320. If the patron's breath demonstrates that her BAC is below the predetermined BAC, she may be enabled to withdraw beverage from liquid containing device 304 via tap 350. Conversely, if the patron's breath demonstrates that her BAC is at or above the predetermined BAC level, she may be precluded from withdrawing beverage from liquid containing device 304 via tap 350 for a period of time (e.g., until she is able to breathe into the breathalyzer and demonstrate a BAC level below the predetermined BAC level).

Alternatively, or additionally, in some embodiments monitoring module 342 may include a scale that may be used for purposes of weighing a patron. The patron's weight may be used as a proxy for determining the volume of liquid that the patron is enabled to withdraw from liquid containing device 304/tap 350 over a given (e.g., a predetermined) amount of time. For example, a patron that weighs 250 pounds may be given the ability to withdraw the equivalent of 16 ounces of beer over a one hour time frame, whereas a patron weighing 125 pounds may be given the ability to withdraw the equivalent of 8 ounces of beer over a one hour time frame. Different rate thresholds (e.g., volumes of liquid withdrawn per unit time) may be used in some embodiments. In some embodiments, volume/amount withdrawn may serve as a threshold.

The patron's gender may also be used as a factor in the model for purposes of determining the rate at which the patron may withdraw liquid. For example, in some embodiments, a male patron may be allowed to withdraw, e.g., two ounces more than a female patron over a given time frame. Similarly, age may be included as a factor.

A patron's history may influence the volume of liquid that may be withdrawn in some embodiments. For example, a patron's history/record may be communicated to data processor 324 from one or more (police operated/owned) servers. If the patron has a police record indicative of driving with ability impaired (DWAI) or driving under the influence (DUI), that patron may be entitled to, e.g., three ounces less of alcoholic beverages per hour than a similarly situated patron with an unblemished police record.

Monitoring module 342 may be responsive to a command entered by ownership, management, or personnel associated with establishment 200. For example, personnel positioned behind bar 206 of FIG. 2 may monitor the floor of establishment 200 and may cut-off one or more patrons by entering a command (e.g., pressing a key) on a computing device positioned behind bar 206 (e.g., computer 208 of FIG. 2).

As described above, the cut-off command may apply to a specific patron. For example, and in reference to FIG. 3B, in embodiments where patrons run/swipe a credit card or debit card through payment module 336, data processor 320 may store information identifying the patron/card holder, such as the patron's name, in step 370. Data processor may forward the stored identifying information in step 372 to a server 362 associated with an account provider or sponsor of the credit card or debit card. Server 362 may then compare the identifying information received as part of step 372 to a database or library of identification information maintained in conjunction with server 362. Server 362 may communicate in step 374 a picture or photograph of the patron (which may be maintained as part of the same database or library) to computer 208 along with the identifying information. In this manner, computer 208 may maintain a log of pictures of patrons and their corresponding identifying information that come to establishment 200. A patron's picture may be maintained on computer 208 for a period of time, which may be a function of when the patron closes out a tab or otherwise leaves establishment 200 in some embodiments, after which the patron's picture may be deleted from computer 208 for purposes of conserving memory storage capacity on computer 208.

Personnel of establishment 200 may use cameras (e.g., camera 214 of FIG. 2) and corresponding display equipment (which may include computer 208) to monitor the floor of establishment 200. If the personnel determines that a patron is acting unruly upon viewing the camera footage on the display equipment, the personnel may search through the pictures of all the patrons in establishment 200 for purposes of identifying the unruly patron caught on camera. Upon positively identifying the patron's picture, personnel may push a button, key or the like on computer 208 to broadcast a message to serving stations 202 (and more specifically, data processors 320 located therein) as part of step 376. The broadcast message of step 376 may include the identifying information that serves to identify the patron. The broadcast message may include an access action type, the content of which may be determined by the personnel, controlling or restricting the degree of access the identified patron has with respect to serving station 202.

Figure 3B:
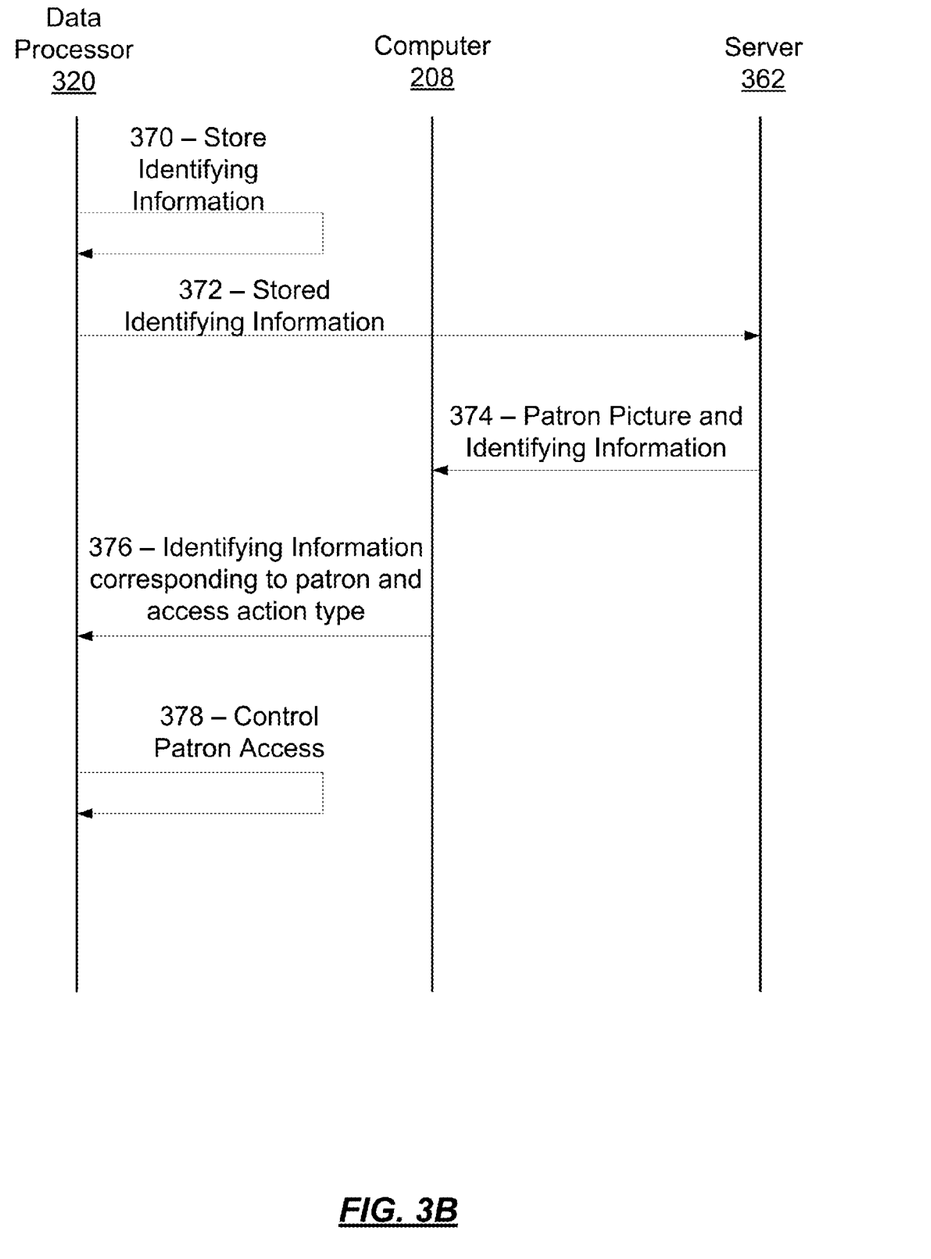
FIG. 3B illustrates a flow diagram for commanding a serving station in accordance with one or more aspects of the disclosure.

In step 378, data processor 320 may determine what action to take, if any, responsive to the message of step 376 described above. For example, if a patron has an open tab with serving station 202, and the content of the access action type included in the broadcast message precludes the patron from further access, data processor 320 may close the tab and prohibit further liquid withdrawal/dispensation from serving station 202 with respect to the patron (based on a comparison between the identifying information stored in step 370 and the identifying information included in the message of step 376). Similarly, if the command access action type merely precludes the patron from further withdrawal/dispensation of alcoholic beverages, the patron may still be able to withdraw non-alcoholic beverages from serving station 202. Other access action types are within the scope and spirit of this disclosure. For example, in some embodiments, an access action type may direct an activity/access with respect to an entire serving station 202 or more than one serving station 202, potentially irrespective of an identity of a patron.

Access rights may be controlled via a computer not located on the floor of establishment 200 (e.g., via a remote computer, as opposed to computer 208 located behind bar 206). For example, a patron may take offense to being cut-off, and in some cases may even become agitated or violent. Cameras (e.g., camera 214 of FIG. 2) may be used to monitor the floor of establishment 200, and a manager or the like located at a remote location may exercise discretion to cut-off one or more patrons.

Patron identification may take place via techniques other than, or in addition to, credit or debit card swiping. For example, in some embodiments a scanning gun may be included as part of serving station 202. The scanning gun may be used for scanning a bar code associated with a driver's license, a passport, or the like. Communication techniques similar to those described above with respect to FIG. 3B may be used in such embodiments. Embodiments including both a scanning gun of a driver's license/passport and credit/debit card swiping identification may be used as a "double-check" of a patron's identification, providing for a more robust solution than if only a single-check is used.

In some embodiments, a serving station 202 may include a payment module 336 and a monitoring module 342 for each patron at a serving station 202 (e.g., based on the number of chairs 204 at each serving station 202). In some embodiments, a single payment module 336 and monitoring module 342 may be used at a serving station, and the patrons may be distinguished from one another based on the card run/swiped through payment module 336.

In terms of dispensing liquid, as described above, tap 350 may represent the interface between liquid containing device 304 and the patron (or more specifically, the patron's cup/glass/pitcher). While a single tap 350 is shown in FIG. 3A, embodiments may include more than one tap. For example, a serving station 202 may include full-service characteristics of a typical bar. In some embodiments, serving station 202 may include taps constituting the most popular drinks (e.g., a subset of a full-service bar), and if a patron desires a drink different from the types of drinks available at serving station 202, the patron may go to bar 206 for full-service.

In some embodiments, the choice of which drink types (e.g., the type of liquids contained in liquid containing device (s) 304) to locate at serving stations 202 may be based on historical sales trends, specials offered by establishment 200, or the like. For example, if brand X beer is offered as a special on Sunday afternoons, and brand X beer constitutes 80% of the drinks served by establishment 200 on Sundays, then 80% of serving stations 202 may be outfitted with liquid containing devices 304 including brand X beer. In this manner, establishment 200 may be positioned to approximate likely patron demand on Sundays, thereby minimizing the likelihood of service downtime (e.g., patrons not having access to the types of beverages they want).

Figure 4A:
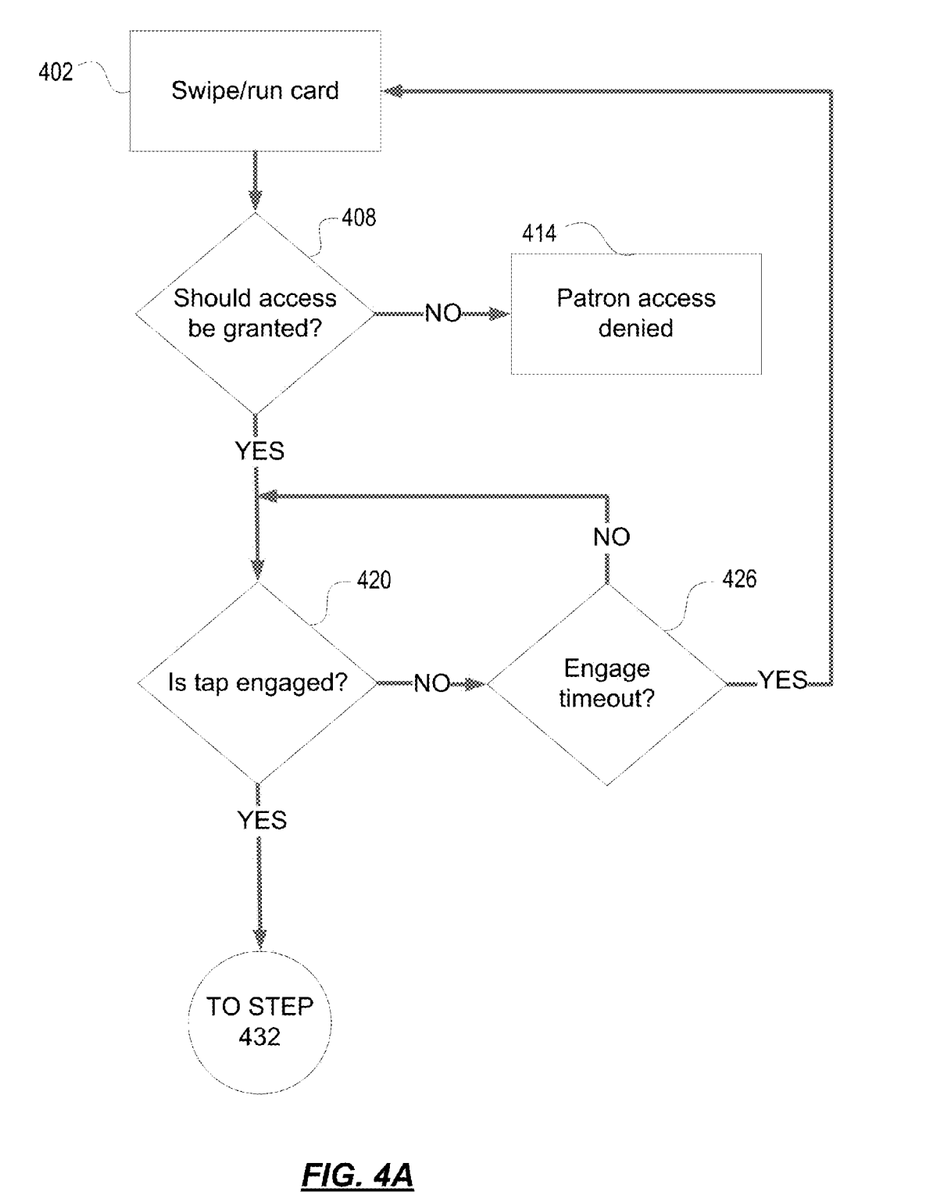
FIGS. 4A-4B illustrate a method for dispensing liquid in accordance with one or more aspects of the disclosure.
Figure 4B:
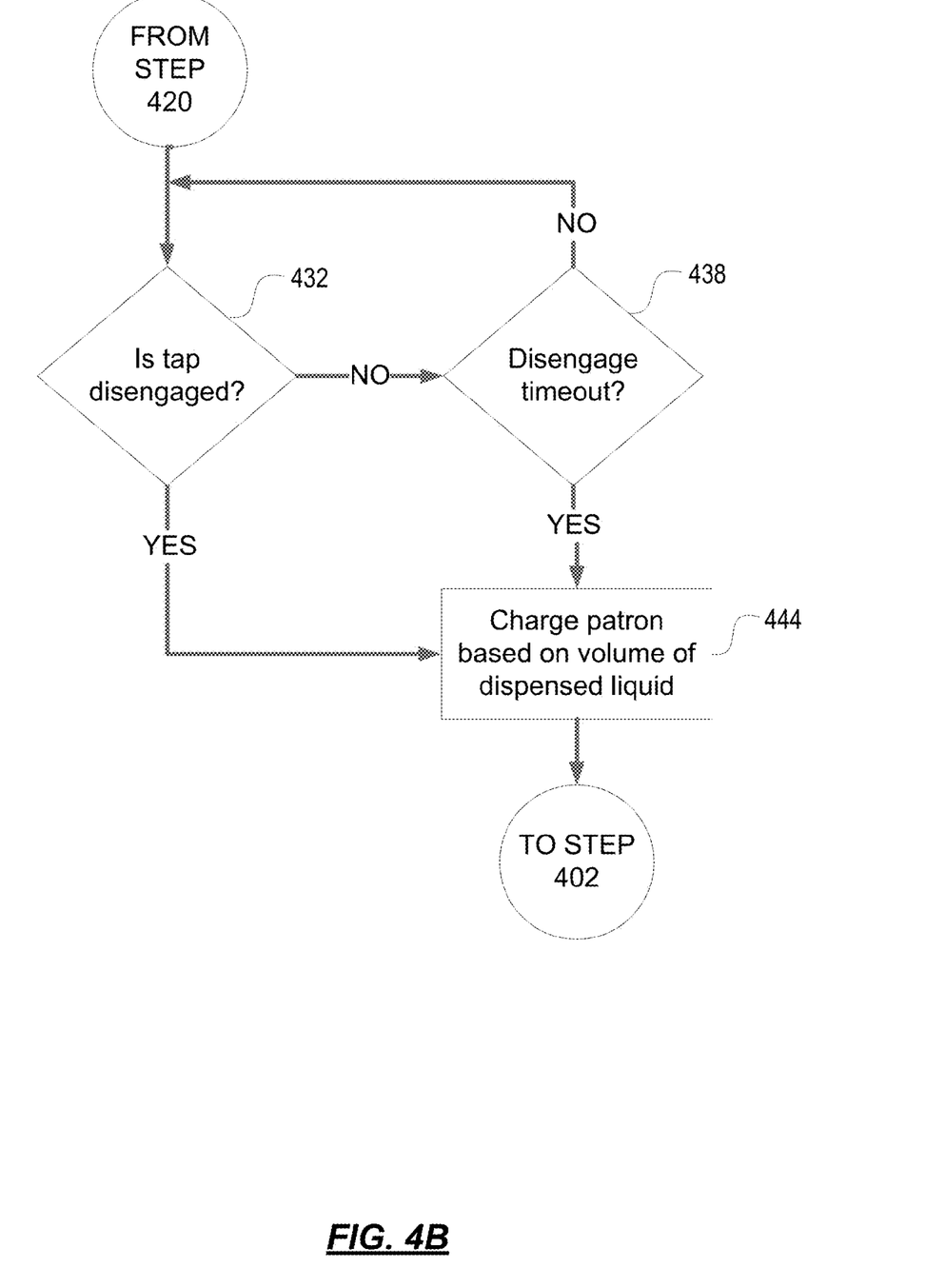

FIGS. 4A-4B demonstrate a method suitable for practicing one or more aspects of the disclosure. The method of FIGS. 4A-4B is described below with respect to establishment 200 of FIG. 2 and serving station 202 of FIG. 3A. The method may be executed on data processor 320, and/or any other computing device(s). The method may be adapted to accommodate different formats/layouts for an establishment or serving station.

In step 402, a patron may swipe or run a card through payment module 336. As described above, the card may be a credit or debit card that is linked to an account associated with the patron. Additionally, or alternatively, the card may be associated with establishment 200.

In step 408, a determination may be made whether the patron should be given access to serving station 202 (or more specifically, liquid contained within liquid containing device 304). For example, a check may be made with respect to a breathalyzer exam, a weight determination, whether the patron has been cut-off by personnel/management of the establishment 200, the patron's consumption of liquid (optionally over time), etc. If the patron should not be given access (e.g., the "NO" path is taken out of step 408 in FIG. 4), then patron access may be denied in step 414 (and a display message and/or an auditory alarm/sound to this effect may be presented/played on payment module 336 and/or monitoring module 342). The denial of access may persist until a predetermined criterion has been satisfied (e.g., a sufficient amount of time elapses, the patron is able to pass a breathalyzer exam, etc.).

If the patron is authorized to obtain access to serving station 202 (e.g., the "YES" path is taken out of step 408 in FIG. 4), a display message or auditory alarm/sound to this effect may be presented/played on payment module 336 and/or monitoring module 342. The method may proceed to step 420.

A determination may be made in step 420 whether tap 350 is engaged. If the patron has not engaged tap 350 (e.g., the "NO" path is taken out of step 420), an engagement timer may be compared against a threshold in step 426 to determine if the tap has not been engaged within a threshold amount of time. For example, if a patron has not engaged tap 350 within ten seconds of having received authorization to access serving station 202 via step 408, a timeout may be declared (e.g., the "YES" path may be taken out of step 426) and the method may return to step 402 in order to preclude a second patron within establishment 200 from obtaining access using the authorized patron's account. On the other hand, if the engagement timeout has not expired (e.g., the threshold has not been met), then the method may continue to wait for tap 350 to be engaged (e.g., the "NO" path out of step 426 may be taken).

If the tap is engaged (e.g., the "YES" path is taken out of step 420), then in step 432, a determination may be made whether the tap is disengaged in step 432. If the patron has not disengaged tap 350 (e.g., the "NO" path is taken out of step 432), then a disengagement timer may be compared against a threshold in step 438 to determine if the tap has been engaged for a threshold amount of time. For example, if the largest glass size available in establishment 200 is 22 ounces, and the output of liquid from tap 350 is 2 ounces per second, then a threshold disengagement value of (22 ounces/2 ounces per second)=11 seconds may be used, corresponding to filling an empty cup/glass/pitcher. If the disengagement timer does not equal the threshold time (e.g., the "NO" path is taken out of step 438) the method may continue to wait for tap 350 to be disengaged. On the other hand, if the disengagement timer is equal to the threshold amount of time (e.g., the "YES" path is taken out of step 438), a(n automatic) shut-off may be activated in order to cease liquid dispensation and to prevent a patron from being charged for liquid in excess of a full glass. The method may proceed to step 444 as shown. An automatic shut-off may be used to correct for a patron forgetting to shut off/disengage tap 350.

If the patron has disengaged tap 350 prior to the disengagement timer reaching the threshold (e.g., the "YES" path is taken out of step 432), or the disengagement timer is reached (e.g., the "YES" path is taken out of step 438), in step 444 a patron may be charged for the liquid withdrawn from liquid containing device 304/tap 350. As described above, the charge may correspond to docking a patron's open tab, the balance of which may be paid off at the conclusion of the patron's stay at establishment 200 (e.g., when the patron closes the tab out). Alternatively, a patron's credit/debit card may be charged each time the method shown in FIGS. 4A-4B is executed.

While steps 426 and 438 were described above with respect to an engagement timer and a disengagement timer, respectively, in some embodiments a single timer (in terms of hardware, software, and/or firmware) may be used. For example, a common timer may be used, with the timer being reset or cleared as part of the transition from step 420 to step 432.

Also, while described above as a fixed disengagement timeout threshold, the disengagement timeout threshold used in conjunction with step 432 may be based on an amount of liquid existing in a glass prior to exiting step 408. For example, a scale may be used to correlate the weight of a semi-full glass to the amount/volume of liquid contained in the semi-full glass. On this basis, the disengagement timeout threshold may be adjusted to correspond to filling a variable semi-full glass. In this manner, a patron might not be charged for liquid that her glass cannot possibly hold.

The steps described above with respect to the method of FIGS. 4A-4B are illustrative. In some embodiments, some steps may be made optional. In some embodiments, the order or sequence of the steps may be changed. In some embodiments, additional steps not shown may be included. For example, if an establishment 200 is putting on a music concert from 9 PM to 1 AM and is serving alcoholic beverages, the amount of liquid that may be withdrawn may be made a function of the current time. For example, earlier in the evening (e.g., at 9:30 PM) patrons may be able to withdraw liquid at a greater rate than later in the evening (e.g., at 11:45 PM) in order to ensure that the patrons are sober at the end of the concert at 1 AM.

In some embodiments, the dispensation of liquid may be conditioned based on a patron input. For example, the patron may (optionally, instead of engaging and disengaging a tap) specify the amount/volume of liquid she wishes to withdraw. A payment module (e.g., payment module 336) in conjunction with a data processor (e.g., data processor 320) may allow the patron to specify the amount she wishes to withdraw from a liquid containing device (e.g., liquid containing device 304). For example, the patron may specify via a payment module that she wants to withdraw two ounces of liquid. Based on this input, the liquid containing device may condition the amount of liquid that may be dispensed to be up to two ounces. Such features may be beneficial if the patron wishes to merely sample a liquid (e.g., a taste-test) and/or if the tap dispenses liquid at relatively fast rates such that the patron wants to impose additional controls or limits on the amount of liquid dispensed.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more computing networks. In addition, various signals representing data or events as described herein may be transferred between a source and a destination in the form of electromagnetic waves traveling through signal-conducting media such as metal wires, optical fibers, and/or wireless transmission media (e.g., air and/or space).

As described herein, the various methods and acts may be operative across one or more computing servers and one or more computing networks. The functionality may be distributed in any manner, or may be located in a single computing device (e.g., a server, a client computer, etc.). Real-time (or substantially real-time) access to liquid dispensation information may be obtained from various serving stations.

As described herein, the methodological acts and processes may be tied to particular machines or apparatuses. For example, one or more computers may include one or more processors and memory storing instructions, that when executed, perform the methodological acts and processes described herein. The one or more processors may be operative on computer data, and may be referred to as computer data processor(s). In some embodiments, a liquid dispensation computer and/or server may be used. Furthermore, the methodological acts and processes described herein may perform a variety of functions including transforming an article (e.g., computer data) into a different state or thing (e.g., liquid dispensation information including the identity of a consuming patron, characteristics of the patron (e.g., the age, weight, history of the patron), the amount of liquid the patron has withdrawn (per unit time), controlling patron access, and the like). In some embodiments, the transformation may take place in accordance with a predefined algorithm or formula.

Aspects of the disclosure may enable an establishment to reduce the number of employees required in terms of servers, bartenders, wait staff and the like, or alternatively, to reassign those employees to different tasks/roles. Bottlenecks at nightclubs, restaurants, bars and the like with respect to checking identifications at the door may be lessened or eliminated, thereby improving the free flow of patrons into and out of an establishment.

In terms of liquid dispensation, patrons might only be charged for that amount of liquid they actually withdraw/consume. Patrons may be given greater flexibility in terms of the amount of liquid they withdraw at any given time.

Patrons may be able to control the quality or characteristics associated with the liquid they withdraw. For example, a patron may desire to purchase four "quarter beers" at a time (as opposed to a full beer) so that each sip of beer is refreshingly cold. Furthermore, a patron serving herself beer may be able to control the amount of foam/head at the top of the glass to her liking by varying the tilt or degree of her glass with respect to a tap (e.g., tap 350 of FIG. 3A). Such possibilities are not present using traditional techniques, particularly on busy nights at an establishment.

Moreover, controls may be included to ensure that patrons consuming alcoholic beverages do not exceed a safe threshold. Aspects of the disclosure related to "cutting off" patrons may mitigate or eliminate drunk driving, alcohol-infused acts of domestic violence, and the like. Everyone wins when everyone gets home safe after a night of social/light drinking with friends.

In some embodiments, a patron may want to purchase liquid from an establishment for others (e.g., her friends, family, colleagues, and the like, generally referred to as the patron's guests). For example, a patron may want to purchase a round of beers for her guests. In those embodiments, the patron's guests may be required to present a license, passport, or some other form of identification that may be scanned at a serving station using or more of the techniques described above (e.g., a scanning gun/scanning device). In this manner, a cut-off may be applied to each of the patron and the patron's guests (each of whom may generally be referred to as a user of a serving station), while still providing an opportunity to charge an account (e.g., an open tab, a credit/debit card account, a bank account, etc.) associated with the patron for the drinks consumed by the patron and the patron's guests. In those embodiments, the patron may swipe a card (e.g., a credit card, a debit card, a card provided to the patron by the establishment, etc.) to allow the patron's guest to have access to the serving station on the patron's account. Alternatively, or additionally, an authorization key (e.g., a password, personal identification number (PIN) or the like) may be provided to the patron to identify and charge the patron's account. The patron may share the authorization key with her guests. In some embodiments, the authorization key may have a limited lifetime (e.g., the authorization key may be effective for an evening) before it expires, thereby allowing the patron to return to the establishment at a later time and not have previously authorized guests still have access to the patron's account/tab at the later time.

Aspects of the disclosure have been described in terms of dispensation of beverages, and in particular, alcoholic beverages. One skilled in the art will appreciate that those aspects may be adapted to accommodate different types or liquid dispensation. For example, the amount of soda a patron afflicted with diabetes may withdraw may be monitored via blood sugar or insulin measurements. The techniques described herein may also be applied to the dispensation of liquid chemicals that may be used in a chemistry laboratory, for example. Additional applications for dispensing liquids to a patron are within the scope and spirit of the disclosure.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A method comprising:
   determining an identity of a user;
   determining that the identified user is authorized to withdraw liquid;
   dispensing liquid responsive to determining that the identified user is authorized to withdraw liquid and responsive to determining that a tap is engaged within a threshold amount of time from a time when the determination is made that the identified user is authorized to withdraw liquid; and
   charging an account based on an amount of liquid dispensed.

2. The method of claim 1, further comprising:
   determining that a card is swiped in a payment module,
   wherein determining the identity of the user is based on identifying information encoded on the card.

3. The method of claim 2, wherein the card is one of a credit card and a debit card.

4. The method of claim 1, wherein determining that the identified user is authorized to withdraw liquid comprises determining that the identified user is of a legal age to purchase alcoholic beverages.

5. The method of claim 1, wherein determining that the identified user is authorized to withdraw liquid comprises determining that the identified user passes a breathalyzer test.

6. The method of claim 1, wherein determining that the identified user is authorized to withdraw liquid comprises determining that the identified user has withdrawn liquid at a rate less than a second threshold.

7. The method of claim 6, wherein the second threshold is based on a weight of the identified user.

8. The method of claim 6, wherein the second threshold is based on a police record associated with the identified user.

9. The method of claim 6, wherein the second threshold is based on a current time.

10. The method of claim 1, further comprising:
    determining that the tap is disengaged subsequent to determining that the tap is engaged, wherein the charging of the account is based on the amount of liquid dispensed between when the tap is engaged and when the tap is disengaged.

11. The method of claim 1, further comprising:
   determining that the tap is engaged for a second threshold amount of time; and
   ceasing liquid dispensation responsive to determining that the tap is engaged for the second threshold amount of time.

12. The method of claim 11, wherein the second threshold amount of time is based on an amount of liquid in at least one of a glass, a cup, and a pitcher prior to the engagement of the tap.

13. The method of claim 12, wherein the amount of liquid in the at least one of a glass, a cup, and a pitcher prior to the engagement of the tap is determined based on a weight of the at least one of a glass, a cup, and a pitcher.

14. The method of claim 1, wherein charging the account comprises charging an account associated with the user.

15. The method of claim 1, further comprising:
   receiving an input specifying a maximum amount of liquid to dispense,
   wherein the dispensing of liquid comprises dispensing liquid in an amount that is less than or equal to the maximum amount specified by the received input.

16. The method of claim 1, wherein the determination of the identity of the user comprises scanning at least one of a driver's license and a passport associated with the user.

17. An apparatus comprising:
   at least one processor; and
   memory storing instructions that, when executed by the at least one processor, cause the apparatus to:
      determine an identity of a user,
      determine that the identified user is authorized to withdraw liquid,
      dispense liquid responsive to determining that the user is authorized to withdraw liquid and responsive to determining that a tap is engaged within a threshold amount of time from a time when the determination is made that the identified user is authorized to withdraw liquid, and
      charge an account based on an amount of liquid dispensed.

18. The apparatus of claim 17, wherein determining that the identified user is authorized to withdraw liquid comprises determining that the identified user is of a legal age to purchase alcoholic beverages.

19. The apparatus of claim 17, wherein the instructions, when executed by the at least one processor, cause the apparatus to:
   analyze data correlative of the user's breath, and
   determine, based on the analyzed data, that the user's blood alcohol content (BAC) is below a predetermined BAC level,
   wherein determining that the user is authorized to withdraw liquid is based on the determination that the user's BAC is below the predetermined BAC level.

20. The apparatus of claim 17, wherein the instructions, when executed by the at least one processor, cause the apparatus to:
   receive a command comprising an access action type, and
   control liquid dispensation in accordance with the access action type.

21. The apparatus of claim 20, wherein the instructions, when executed by the at least one processor, cause the apparatus to:
   store the identity of the user as identifying information,
   compare the stored identifying information with identifying information included in the command, and
   determine that the comparison generates a match between the stored identifying information and the identifying information included in the command,
   wherein controlling of the liquid dispensation applies with respect to the user responsive to determining that the comparison generates a match between the stored identifying information and the identifying information included in the command.

22. The apparatus of claim 17, wherein the instructions, when executed by the at least one processor, cause the apparatus to:
   receive an authorization key,
   wherein the account charged corresponds to an account identified by the authorization key.

23. A non-transitory computer-readable medium comprising instructions that, when executed, cause a device to:
   determine an identity of a user;
   determine that the identified user is authorized to withdraw liquid;
   dispense liquid responsive to determining that the identified user is authorized to withdraw liquid and responsive to determining that a tap is engaged within a threshold amount of time from a time when the determination is made that the identified user is authorized to withdraw liquid; and
   charge an account based on an amount of liquid dispensed.

24. The non-transitory computer-readable medium of claim 23, wherein the instructions, when executed, cause the device to:
   receive a command comprising an access action type particular to the user, and
   control liquid dispensation for the user in accordance with the access action type,
   wherein the access action type is based on a comparison of a first picture of the user provided by a server based on the identity of the user and a second picture of the user taken by a camera in an establishment in which the device is located.

25. The non-transitory computer-readable medium of claim 23, wherein the instructions, when executed, cause the device to:
   receive an input that specifies at least one of a volume and an amount of liquid to dispense,
   wherein the dispensation of liquid is based on the input.

26. The apparatus of claim 20, wherein the command is included in a broadcast message, and wherein the instructions, when executed by the at least one processor, cause the apparatus to:
   close an open tab associated with the user based on a determination that the content of the access action type precludes the user from a further dispensation of liquid.

* * * * *